(12) United States Patent
Cormier

(10) Patent No.: US 11,136,004 B2
(45) Date of Patent: Oct. 5, 2021

(54) DUAL DEVICE CLEANING APPARATUS

(71) Applicant: Craig Stephen Cormier, Calgary (CA)

(72) Inventor: Craig Stephen Cormier, Calgary (CA)

(*) Notice: Subject to any disclaimer, the term of this patent is extended or adjusted under 35 U.S.C. 154(b) by 157 days.

(21) Appl. No.: 15/924,051

(22) Filed: Mar. 16, 2018

(65) Prior Publication Data

US 2018/0265051 A1 Sep. 20, 2018

Related U.S. Application Data

(60) Provisional application No. 62/473,943, filed on Mar. 20, 2017.

(51) Int. Cl.
| | | |
|---|---|---|
| *B60S 3/04* | (2006.01) | |
| *A47L 13/11* | (2006.01) | |
| *G09F 23/00* | (2006.01) | |
| *B08B 1/00* | (2006.01) | |
| *A47L 1/06* | (2006.01) | |

(52) U.S. Cl.
CPC ............. *B60S 3/045* (2013.01); *A47L 1/06* (2013.01); *A47L 13/11* (2013.01); *B08B 1/005* (2013.01); *G09F 23/00* (2013.01)

(58) Field of Classification Search
CPC .... B60S 3/045; B60S 3/04; A47L 1/06; A47L 13/11; A47L 13/12; A47L 1/09; A47L 1/15; A47L 1/16; A47L 13/08; A47L 13/16; A47L 1/12; A47L 1/13; B08B 1/005;
(Continued)

(56) References Cited

U.S. PATENT DOCUMENTS

| 834,667 | A | * | 10/1906 | Flynn | .................... A47L 1/06 |
|---|---|---|---|---|---|
| | | | | | 15/121 |
| RE19,152 | E | * | 5/1934 | Schacht | .................. A47L 17/06 |
| | | | | | 15/245 |

(Continued)

FOREIGN PATENT DOCUMENTS

| CN | 303111982 | 2/2015 |
|---|---|---|
| CN | 303667667 | 5/2016 |

(Continued)

OTHER PUBLICATIONS

Combination squeegee on one end and scraper on other end—Google Search, https://www.google.com/...scraper+on+other+end &tbm&source=Inms&sa=X&ved= 0ahUKEwjm4vGH1rzgAhUCTN8KHTtGBpwQ_AUICigB&biw= 1280&bih=663&dpr=1.5, site visited Feb. 14, 2019, 5 pages.

(Continued)

*Primary Examiner* — Robert J Scruggs

(57) ABSTRACT

Disclosed is a dual squeegee apparatus that may be sold to fuel station chains to replace the previous single squeegee designs, and thus offer patrons the ability to clean exterior automotive mirrors, lights and smaller windows in addition to the rest of the windows. This may enable fuel station chains to benefit from offering a competitive advantage to their customers to ideally secure more fuel sales and customer attention. This idea has very important benefits: It allows customers to clean the exterior of their vehicles mirrors, lights and smaller windows in addition to the rest of the windows. Never previously offered by any fuel station chains, and by facilitating extra customer service for the purchasing fuel station chains, this may in turn secure more sales and suggests increased profits.

22 Claims, 11 Drawing Sheets

(58) Field of Classification Search
CPC .. B08B 1/00; B08B 1/006; G09F 23/00; A47J 43/288
See application file for complete search history.

(56) References Cited

U.S. PATENT DOCUMENTS

| | | | |
|---|---|---|---|
| 2,536,311 A | | 1/1951 | Rojakovick |
| 2,649,600 A | | 8/1953 | Loveland |
| 2,908,927 A | * | 10/1959 | Peterson ................ A46B 15/00 15/177 |
| D219,304 S | | 11/1970 | Willinger |
| D235,410 S | | 6/1975 | Epstein |
| D243,355 S | | 2/1977 | Spencer |
| 4,302,862 A | | 12/1981 | Machacek et al. |
| D291,378 S | | 8/1987 | Viner |
| 4,881,291 A | * | 11/1989 | Ellis ..................... A63F 3/068 15/236.01 |
| D335,771 S | | 5/1993 | Mallory et al. |
| 5,255,405 A | * | 10/1993 | Samuelsson ............. A47L 1/06 116/110 |
| 5,528,793 A | * | 6/1996 | Schbot ................. A47L 13/12 15/244.1 |
| 5,709,005 A | * | 1/1998 | Brach, Jr. ............. A47L 13/11 15/143.1 |
| 5,857,237 A | | 1/1999 | Dranginis |
| 5,864,913 A | | 2/1999 | Robertson et al. |
| D407,876 S | | 4/1999 | Ward |
| 6,082,915 A | | 7/2000 | Kimmel |
| 6,092,255 A | * | 7/2000 | Kim ..................... A47L 1/06 15/105 |
| D447,301 S | | 8/2001 | Adair et al. |
| D449,143 S | | 10/2001 | Spear et al. |
| D450,898 S | | 11/2001 | Mitchell |
| D453,075 S | | 1/2002 | Liu |
| 6,481,041 B1 | | 11/2002 | Ingram |
| D485,031 S | | 1/2004 | Anderson et al. |
| D485,656 S | | 1/2004 | Anderson et al. |
| D501,727 S | | 2/2005 | Liu |
| 6,990,705 B1 | | 1/2006 | Schouten et al. |
| D518,542 S | | 4/2006 | Yen |
| 7,069,616 B2 | | 7/2006 | Watkins |
| 7,155,770 B2 | | 1/2007 | Anderson et al. |
| D539,496 S | | 3/2007 | Sickler et al. |
| D544,160 S | | 6/2007 | Thomas |
| D562,000 S | | 2/2008 | Liu |
| 7,343,637 B2 | | 3/2008 | Lafleur |
| D597,315 S | | 8/2009 | Hoffelner |
| 7,832,955 B1 | | 11/2010 | Leffew et al. |
| D649,313 S | | 11/2011 | Ediger et al. |
| D656,736 S | | 4/2012 | Hoffelner |
| 8,312,589 B1 | | 11/2012 | Thomas |
| D685,554 S | * | 7/2013 | Malvasio ................ D32/40 |
| D703,406 S | | 4/2014 | Meyer |
| D704,449 S | | 5/2014 | Ihde et al. |
| D722,213 S | | 2/2015 | Cohen |
| 9,084,525 B2 | | 7/2015 | Cohen |
| 9,145,112 B1 | * | 9/2015 | Ihde ................. A46B 15/0081 |
| 9,192,277 B1 | * | 11/2015 | Hughes ............... H05K 3/1216 |
| D750,380 S | | 3/2016 | Blouin et al. |
| D753,890 S | | 4/2016 | Zemel et al. |
| D785,338 S | | 5/2017 | Henningsen |
| D824,128 S | | 7/2018 | O'Shea |
| D825,127 S | | 8/2018 | Haarburger |
| D838,493 S | | 1/2019 | Thuma et al. |
| 10,640,093 B2 | | 5/2020 | Wood et al. |
| 2002/0052248 A1 | | 5/2002 | Chen |
| 2003/0216192 A1 | | 11/2003 | Chu |
| 2004/0250365 A1 | | 12/2004 | Anderson et al. |
| 2006/0021175 A1 | | 2/2006 | Peroni |
| 2011/0173768 A1 | * | 7/2011 | Donato ................. A47L 1/06 15/245 |
| 2011/0302735 A1 | * | 12/2011 | Santarsiero ........... A47L 13/11 15/117 |
| 2018/0021935 A1 | | 1/2018 | Blouin et al. |

FOREIGN PATENT DOCUMENTS

| | | |
|---|---|---|
| EP | 0833298 A1 | 4/1998 |
| WO | 01/58332 A1 | 8/2001 |

OTHER PUBLICATIONS

Hopkins Ice Crusher Extendable Ice Scraper with Snow Brush and Squeegee, https://www.etrailer.com/Winter-Weather-Supplies/Hopkins/HM16619.html, site visited Feb. 14, 2019, 6 pages.

Amazon.com: Snow MOOver ice scraper foam brush, reviews 2017, https://www.amazon.com/Snow-MOOver-Extendable-Scraper-Scratch/dp/B076PMWX8X, site visited Mar. 4, 2021, 10 pages.

Amazon.com: Ice Scraper w/ Snow Brush & Squeegee, reviews 2019, https://www.amazon.com/Scraper-Squeegee-Windshield-Accessories-Cleaning/dp/B07ZW ..., site visited Mar. 4, 2021, 12 pages.

* cited by examiner

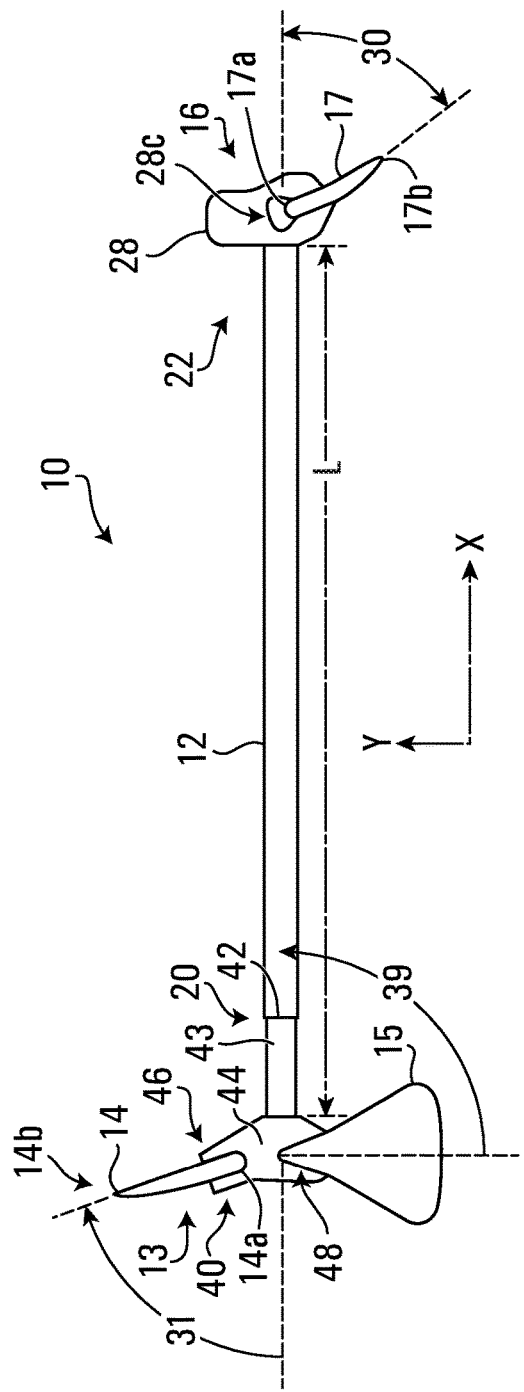
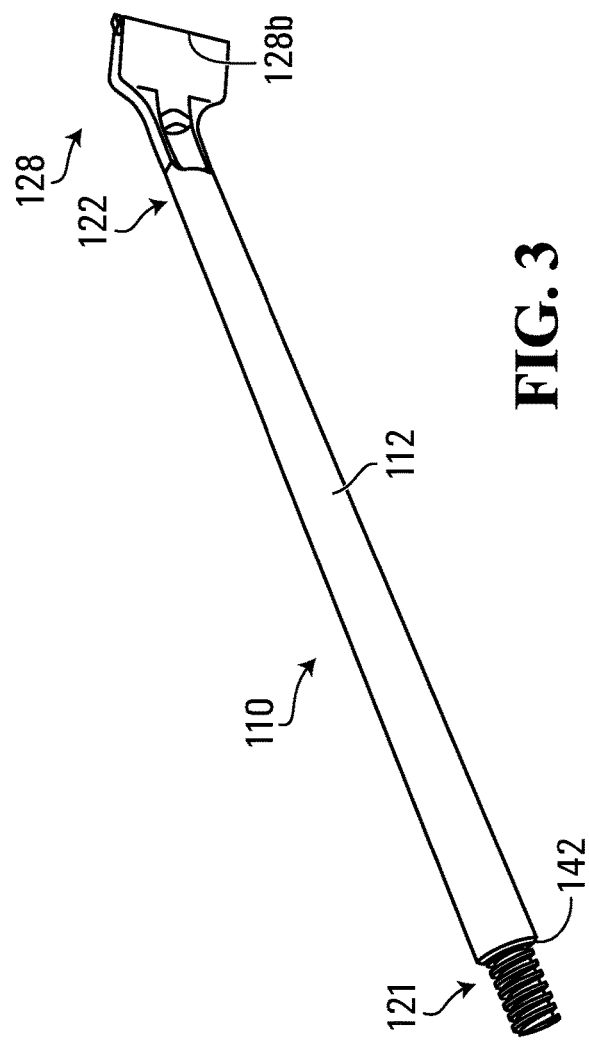
FIG. 2
FIG. 3

DUAL DEVICE CLEANING APPARATUS

CROSS REFERENCE TO RELATED APPLICATION

The present application claims priority to U.S. Provisional Patent Application Ser. No. 62/473,943 filed on Mar. 20, 2017, the entire contents of which is hereby expressly incorporated herein by reference.

FIELD

This disclosure generally relates to a double cleaning device (eg. dual squeegee) for use with automobiles and other vehicles and that may include a large end (eg. standard size end) that can be specifically designed to clean most exterior areas including windows, mirrors and lights as well as to remove water from most exterior windows. The other end (smaller end) can be used to remove excess water from exterior lights, mirrors and small windows not accessible by the larger end (standard size) once such areas have been cleaned.

BACKGROUND

Patrons of vehicle fuel services stations will be well familiar with the windshield fluid liquid storage bins of a motor vehicle washing service unit. Typically the fuel service station will provide fluid contained in a liquid storage bin and a squeegee apparatus that can be used by patrons to clean the windshields of their vehicles. The squeegee apparatuses are typically presented to the customer with the cleaning tool at the end of the handle located at the bottom of the fluid storage bin with the handle extending upwards such that it can be easily picked up by the hand of a patron.

The current automotive squeegee market only offers fuel station patrons larger (standard size) window cleaner/squeegees. Therefore, if you need to squeegee clean excess water from your smaller sized windows, lights and exterior mirrors, you need a much smaller size squeegee.

Squeegee apparatuses provided to patrons of fuel service stations are often lost, stolen and/or are damaged. Therefore, to avoid additional costs, service station owners are usually not interested in providing patrons with two separate squeegee devices to utilize in cleaning their vehicles.

On many occasions while filling up at fuel stations, I have decided to clean my windows, headlamps and side mirrors with the provided squeegee but not able to clear the excess water from the mirrors and lights due to the squeegee being too large.

This has been observed with other people at fuel stations over the years and a need was identified. Many people are using the scrub/sponge end of the large squeegees provided at fuel stations on their side mirrors and lights with difficulty and are not able to squeegee them clean, leaving them to remain streaked and still dirty and possibly freezing and covered with a layer of ice in the winter time, obstructing the viewing capability.

In a competitive fuel market, every fuel station chain needs a competitive edge to offer to draw in new and existing customers.

Fuel station chains do not typically manufacture their own squeegees, but purchase from a supplier. This invention will allow fuel companies to offer a solution to the aforesaid problems and may provide a competitive edge.

Providing the present invention could help provide an individual chain a competitive and economic advantage by allowing consumers to use this invention to properly clean all of their vehicles "harder to reach" areas without obstruction and difficulty.

SUMMARY

In an embodiment, this invention combines two differently sized squeegees into one cleaning apparatus.

The squeegee device of the present disclosure can provide fuel station patrons with a dual ended squeegee and window cleaner to allow such patrons the ability to clean their dirty lights and side mirrors in addition to all of their windows in one item. In the past, fuel station patrons have been using the large scrub end of a squeegee and are not able to squeegee clean the remaining dirt from side mirrors, lights, and smaller windows leaving them streaked, still dirty and with left over water. The left over water can freeze in the winter months causing obstructed vision.

According to one aspect, there is provided a squeegee device comprising a handle, a first cleaning device positioned at a first end of the handle and a second cleaning device positioned at a second end oppositely disposed from the first end of the handle wherein the first cleaning device comprises a first squeegee blade and a sponge and the second cleaning device comprises a second squeegee blade.

According to another aspect, there is provided a kit comprising: (i) a first part comprising a handle having a first end and a second end, the second end having a first cleaning device comprising a first squeegee blade secured thereon; and (ii) a second part comprising a second cleaning device, the second cleaning device comprising a sponge and second squeegee blade.

In another aspect, there is provided a method for manufacturing a squeegee device adapted to clean and remove liquids from a surface comprising: molding a handle out of a first material; molding a squeegee blade out of a second material to a first end of the handle where the second material had a softer hardness than the first material; and, securing a first cleaning device comprising a sponge and squeegee blade to a second end of the handle opposite the first end of the handle.

In yet another aspect, there is provided a method for cleaning a hard surface of a motor vehicle with the squeegee device of the present disclosure comprising applying a liquid surface cleaner stored in the sponge of the first cleaning device to the hard surface; and squeegeeing the liquid off the hard surface using the first squeegee blade and/or the second squeegee blade.

In an embodiment, the present disclosure relates to a vehicle cleaning apparatus that comprises an elongated handle, a first cleaning device positioned proximate a first end of the handle and a second cleaning device positioned proximate a second end of the handle, the second end oppositely disposed from the first end of the handle, wherein the first cleaning device comprises a first squeegee blade and a sponge and the second cleaning device comprises a second squeegee blade.

In another embodiment, the present disclosure relates to an apparatus wherein the second squeegee blade has a transverse width that is substantially less than a transverse width of the first squeegee blade.

In a further embodiment, the present disclosure relates to an apparatus wherein the transverse width of the second squeegee blade is in the range of about 2 inches to about 6 inches.

In a further embodiment, the present disclosure relates to an apparatus wherein the transverse width of the second squeegee blade is about 3 inches.

In a further embodiment, the present disclosure relates to an apparatus wherein the transverse width of the first squeegee blade is in the range of about 6 inches to about 12 inches.

In a further embodiment, the present disclosure relates to an apparatus wherein the transverse width of the first squeegee blade is in the range of about 8 inches to about 10 inches.

In a further embodiment, the present disclosure relates to an apparatus wherein the transverse width of the first squeegee blade is about 9 inches.

In a further embodiment, the present disclosure relates to an apparatus wherein the second cleaning device has a transverse width that is substantially less than a transverse width of the first cleaning device.

In a further embodiment, the present disclosure relates to an apparatus wherein the second squeegee blade has a transverse width that is suitable for cleaning at least one of a slide mirror or light of a vehicle and the first squeegee blade has a transverse width that is unsuitable for cleaning at least one of a slide mirror or light of a vehicle.

In a further embodiment, the present disclosure relates to the apparatus wherein the first cleaning device further comprises a net-like webbing wrapped around the sponge.

In a further embodiment, the present disclosure relates to the apparatus wherein sponge of the first cleaning device and the second squeegee blade of the second cleaning device are generally oriented at angle and in the same direction from a longitudinal axis of said handle.

In a further embodiment, the present disclosure relates to an apparatus that further comprises a flat surface proximate a second end of the handle, the flat surface comprising advertising indicia.

In a further embodiment, the present disclosure relates to an apparatus wherein the flat surface comprises part of the second cleaning device.

In a further embodiment, the present disclosure relates to an apparatus wherein the flat surface is oriented at an angle to a longitudinal axis of the handle.

In a further embodiment, the present disclosure relates to an apparatus wherein the second cleaning device is formed by an over-molding process wherein the second squeegee blade is secured to the handle as an over-molded part which is over-molded on an end portion of the handle.

In a further embodiment, the present disclosure relates to an apparatus wherein the handle is comprised of a plurality of apertures along a length.

In a further embodiment, the present disclosure relates to an apparatus wherein the handle with the plurality of apertures is formed by an injection molding process.

In a further embodiment, the present disclosure relates to a method for cleaning a hard surface of a motor vehicle with the apparatus, the method comprising applying a liquid surface cleaner stored in the sponge of the first cleaning device to the hard surface; and squeegeeing the liquid off the surface using the first squeegee blade and/or the second squeegee blade.

In a further embodiment, the present disclosure relates to a method for cleaning a first hard surface of a motor vehicle and a second hard surface of a motor vehicle with the apparatus, the method comprising: (i) squeegeeing the liquid off the first hard surface using the first squeegee blade; and (ii) and squeegeeing the liquid off the second hard surface using the second squeegee blade.

In a further embodiment, the present disclosure relates to the method wherein first hard surface comprises a window or windshield and the second hard surface comprises a side mirror, headlight or tail light.

In a further embodiment, the present disclosure relates to a vehicle cleaning apparatus comprising an elongated handle, a first cleaning device positioned proximate a first end of the handle and a second cleaning device positioned proximate a second end of the handle, the second end oppositely disposed from the first end of the handle, wherein the first cleaning device comprises a first flexible blade operable for removing liquid from a smooth surface, the first flexible blade having a width, the second cleaning device comprising a second flexible blade operable for removing liquid from a smooth surface, the second flexible blade having a width that is greater than the width of the first flexible blade.

In a further embodiment, the present disclosure relates to a kit that comprises: (i) a first part comprising a handle having a first end and a second end, the second end having a first cleaning device comprising a first squeegee blade secured thereon; and (ii) a second part comprising a second cleaning device, the second cleaning device comprising a sponge and second squeegee blade.

In a further embodiment, the present disclosure relates to the kit wherein the first end of the handle comprises a first connector for cooperatively engaging with a second connector of the first cleaning device.

In a further embodiment, the present disclosure relates to a method for manufacturing a squeegee device adapted to clean and remove liquids from a surface that comprises: molding a handle out of a first material; molding a squeegee blade out of a second material having a softer hardness than the first material to a first end of the handle; securing a first cleaning device that comprises a sponge and squeegee blade to a second end of the handle opposite the first end of the handle.

In a further embodiment, the present disclosure relates to the method wherein the handle comprises a rigid plastic and the squeegee blade molded to the second end of the handle comprises rubber.

In a further embodiment, the present disclosure relates to a vehicle cleaning apparatus that comprises an elongated handle, a cleaning device positioned proximate an end of the handle, wherein the first cleaning device comprises a first squeegee blade, and further comprising a flat surface proximate the end of the handle, the flat surface comprising advertising indicia.

In a further embodiment, the present disclosure relates to an apparatus wherein the flat surface comprises part of the cleaning device.

In a further embodiment, the present disclosure relates to an apparatus wherein the flat surface is oriented at an angle to a longitudinal axis of the handle.

In a further embodiment, the present disclosure relates to an apparatus wherein the clearing device comprises a first cleaning device positioned proximate a first end of the handle, the apparatus and further comprising a second cleaning device positioned proximate a second end of the handle, the second end oppositely disposed from the first end of the handle, wherein the second cleaning device comprises a first squeegee blade and a sponge and the first cleaning device comprises a second squeegee blade.

In a further embodiment, the present disclosure relates to an apparatus wherein the advertising indicia are located on a decal attached to the flat surface.

In a further embodiment, the present disclosure relates to an apparatus that further comprises a transparent label pouch attached to the flat surface and wherein the advertising indicia are located on a rigid material received within attached label pouch, such that the advertising indicia may be viewed as the rigid material is held in the label pouch.

BRIEF DESCRIPTION OF THE DRAWINGS

FIG. 2 is a side elevation view of the embodiment of FIG. 1;

FIG. 3 is a perspective view of part of alternate embodiment of a dual device squeegee;

DETAILED DESCRIPTION

Figure 1:
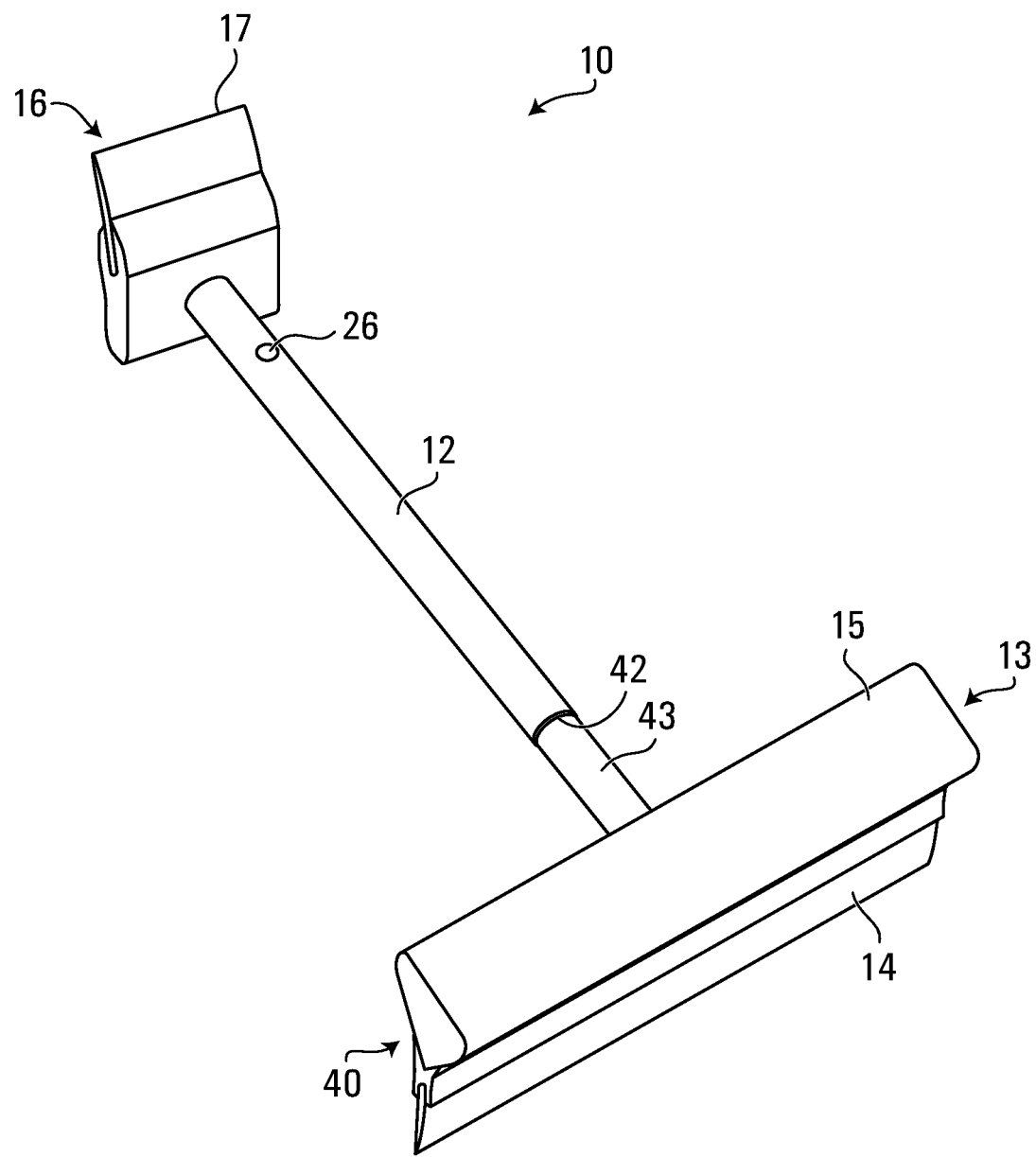
FIG. 1 is a perspective view of an embodiment of a dual device cleaning apparatus.

The present disclosure is to be considered as an exemplification of the invention, and is not intended to limit the invention to the specific embodiments illustrated by the figures or description below.

The following terms shall have the following meanings:

The term "rigid plastic" refers to any type of plastic suitable for the production of a relatively rigid outer jacket capable of withstanding mechanical stresses and chemical attack. Examples of rigid plastics include, but are not limited to, polyethylene terephthalate (PET), amorphous polyethylene terephthalate (APET), polyvinyl chloride (PVC), polylactic acid (PLA), polypropylene (PP), polystyrene (PS) and high density polyethylene (HDPE).

The term "rubber" refers to an elastomeric plastic material, more preferably a mouldable elastomeric material. Example of elastomers include, but are not limited to, nitrile rubber, styrene butadiene rubber, ethylene-propylene terpolymers, natural and synthetic polyisoprene, polybutadiene, polyisobutylene, halogenated polybutyl rubbers, polychloroprene and polyethylenepropylenediene monomer rubbers.

The term "sponge" refers to a liquid absorbing material, such as, but not limited to, cloth, foam and a cellulose sponge.

The following will now describe the inventions intended use and its functionality.

According to one aspect, the dual ended cleaner and squeegee may be used as a "complete" exterior window (large or small), mirror and lights cleaner as one end of the squeegee is a standard size but the other is much smaller for smaller surfaces allowing patrons of fuel stations the ability to clean more exterior components than previously able to with current squeegees on the market.

According to another aspect, the dual ended cleaner and squeegee is intended for sale to fuel station chains and will be available as a replacement to the current squeegees offered.

The important uses for the dual squeegees ends may be as follows; 1) Many fuel station patrons will now have the ability to clean additional "hard to access" areas of the exterior of their vehicles, while filling with fuel, not previously accessible with current market products provided at fuel stations. 2) Having any advantage to offer patrons at a fuel station is an incredible advantage and will lure more customers to the chains locations, increasing revenues.

The squeegees can be made with solid plastic adjoin handle with the larger end (standard size) of the squeegee made from stainless steel, holding in place a rubber squeegee on one side and foam-material scrub on the other. The other (smaller end) squeegee can remain plastic holding a rubber squeegee, such as, but not limited to, a 3 inch wide rubber squeegee. The plastic handle can remain strong to withstand the harsh weather conditions without breaking and may be angled at approximately 45 degrees. The stainless-steel end can resist corrosion and offer more durability under heavier usage, lasting for years. The hole through the handle near the top end of the small squeegee end can be used for hanging on a hook in a retail environment. The complete size of the squeegee may not exceed the length of the ones in current use by fuel stations to be able to still fit into their storage locations.

According to one aspect, the dual ended cleaner and squeegee of the present disclosure can take the form of a squeegee apparatus adapted to clean and remove liquid from an assortment of surfaces having wide ranges of curvature and which may be painted, formed of glass, metal, plastic or other suitable material, and which may be further flat, curved, concave or convex. The squeegee apparatus of the present disclosure can be particularly adapted for cleaning and removing liquids from hard surfaces and profiles of an exterior surface of a motor vehicle such as a window, windshield, headlight, tail light and side mirror.

With reference to FIGS. 1 and 2, and embodiment of a vehicle cleaning apparatus (eg. a dual squeegee apparatus), designated generally by reference number 10, can include an elongated handle 12, a first cleaning device 13 positioned at a first end of the handle and a second cleaning device 16 positioned at a second end oppositely disposed from the first end of the handle 12. The first cleaning device 13 comprises a first squeegee blade 14 and a sponge 15 and the second cleaning device 16 may comprise a second squeegee blade 17. In one aspect, the first squeegee blade and sponge are sized and dimensioned to be larger (ie. wider) than the second squeegee blade.

Referring to FIG. 2, handle 12 has an overall length L extending along a longitudinal direction on axis X and generally includes a first end 20 and a second end 22. According to one aspect, the length L of handle 12 may range from about 18 inches to about 30 inches, while in other aspects, the length of handle 12 may range from about 20 inches to about 28 inches, while in still other aspects the length of handle 12 may range from about 22 inches to about 26 inches.

Handle 12 may be formed from any suitable material or materials such as, but not limited to, a rigid plastic, rubber, composite, wood, or a light weight metal, for example aluminum or aluminum alloy. In one particular aspect, handle 12 is made of a plastic injection molded material and is formed via a plastic injection molding process. However, it should be understood that other types of materials and formation processes or manufacturing techniques are also contemplated for use in association with the present disclosure.

Although depicted as generally cylindrical in cross-section, handle 12 may have any other geometric shape, such as polygonal (for e.g. triangular, rectangular or hexagonal) in cross section without deviating from the spirit and scope of the present disclosure. Handle 12 can also have a thickness or width to provide a grip for a user's hand. Thus, in one aspect, handle 12 can have a diameter within a range of about 0.5 inches to about 1.5 inches, or handle 12 can have a diameter within a range of about 0.75 inches to about 1.25 inches, or handle 12 can even have a diameter within a range of about 0.95 inches to about 1.05 inches.

In addition, handle 12 may include one or more apertures 26 to allow the squeegee apparatus 10 to be attached to a hook or other known means for hanging and storage purposes. When present, the aperture 26 may be located proximate the first end 20, proximate the second end 22, or at the center or offset from the center of handle 12. The aperture 26 may be cylindrically shaped, while in further aspects it may be polygonal shaped (for e.g. triangular, rectangular or hexagonal) and may pass entirely through the body of handle 12.

Figure 4:
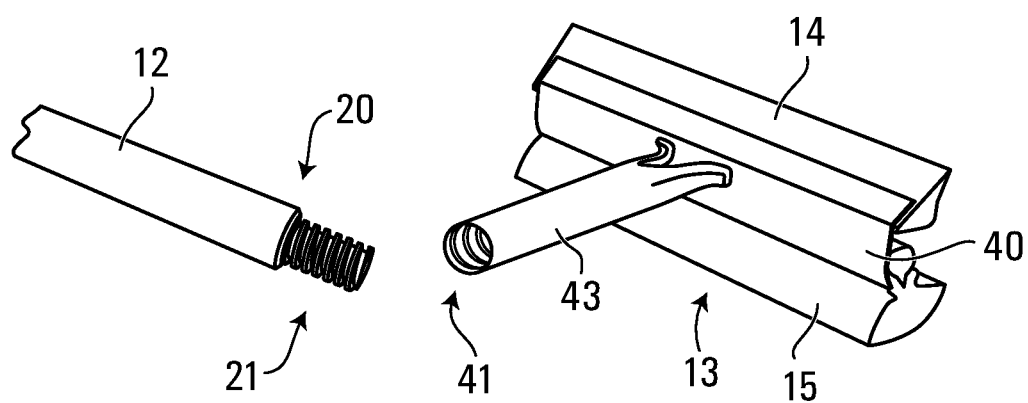
FIG. 4 is a partial end view of the embodiment of FIG. 1 with the end large squeegee device dis-assembled from the handle.

Referring to FIG. 4, in order to couple handle 12 to the first cleaning device 13, the first end 20 may comprise a first connector 21 for cooperatively engaging with a second connector 41 of first cleaning device 14. In one aspect, the first connector 21 can be an externally threaded extension shaped to engage with an internally threaded bore of second connector 41. Alternatively, second connector 41 may be an externally threaded extension or any other suitable means for connecting to a complementary feature of first connector 21.

Figure 5:
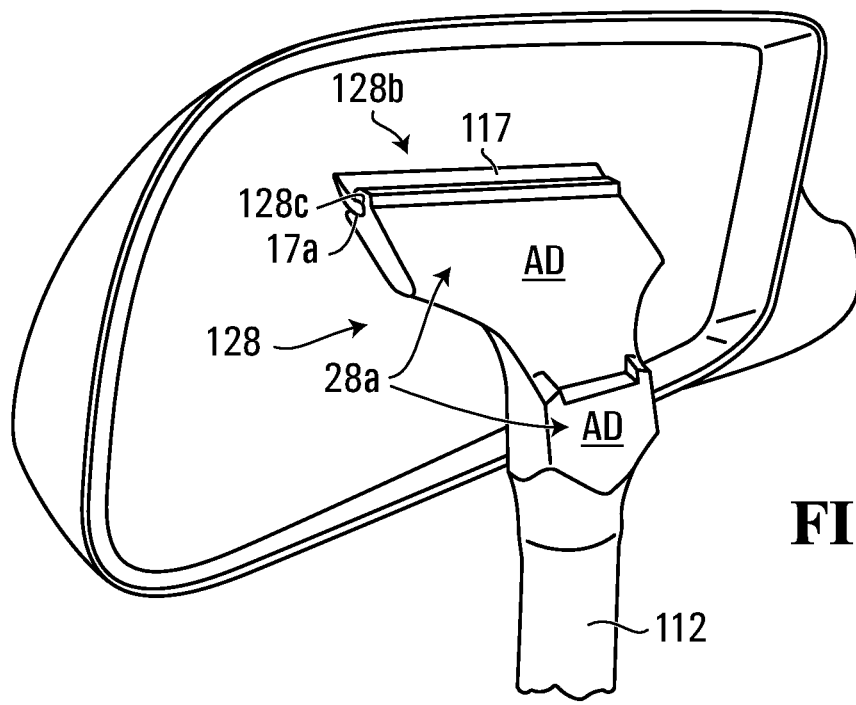
FIG. 5 is a perspective view of an end portion of an embodiment showing a small squeegee device in use on a side mirror of a vehicle.

Referring to FIGS. 3 and 5, parts of another embodiment of an apparatus 110 which is similar to apparatus 10 is shown. Apparatus 110 may include a first cleaning device like first cleaning device 13 described above (but not shown in FIGS. 3 and 5). As shown in FIG. 3 apparatus 110, in order to couple handle 112 (which may be generally constructed like handle 12) to a first cleaning device like first cleaning device 13 (as in FIG. 4), the first end 120 may comprise a first connector 121 for cooperatively engaging with a second connector 41 of first cleaning device 14. The first connector 121 can also be an externally threaded extension shaped to engage with an internally threaded bore of second connector. Alternatively, the second connector may be an externally threaded extension or any other suitable means for connecting to a complementary feature of first connector 121.

Still with reference to the embodiments of FIGS. 3 and 5, second end 122 of handle 112 may include an extension member or integrally formed portion 128 which can be angled with respect to longitudinal axis through handle 112. Extension member/portion 128 may have a smooth surface, as shown in FIG. 5 or it may also include a plurality of recesses (not shown).

With reference to FIGS. 5, 5A, 6, 9, 10 and 11, extension member/portion 128 and/or the over-molded part of the blade 217, can include one or more polygonal flat faces 128a, generally positioned proximate or at the top side the second cleaning device 216. Each of faces 128a may form a display area upon which advertising indicia may be connected. The polygonal flat face 128a can be dimensioned to provide an enlarged surface area to enable viewing of an advertising indicia (AD) not only while squeegee device 110 is being used, but also while it is stored in a bin of a motor vehicle washing service unit. The advertising indicia can be connected and secured to the polygonal flat faces 128a in a variety of ways. For example, the advertising indicia may be a decal that can be adhesively secured to the polygonal flat face 128a, or the advertising indicia can be printed directly onto the polygonal flat face 128a. Alternately a lable pouch 299 (FIG. 5A) may formed of transparent plastic and affixed to flat face 128a. The pouch may receive through a transverse opening and hold a piece of rigid material such as a hard plastic or cardboard bearing advertising indicia which can be viewed through the transparent plastic outer surface of the pouch. In some aspects, the polygonal flat face 128a can be dimensioned such that it extends radially outward from the periphery of extension member 128 as shown in FIG. 5. In another aspect, the radial extent of the polygonal flat face 128a may be within the periphery of extension member 128.

Returning to the embodiment of FIGS. 1 and 2, the extension member 28 of handle 12 may also include an outer end 28b upon which the second cleaning device 16 can be provided/secured. The second cleaning device 16 may include a second squeegee blade 17 which can be made of a resilient elastomeric material, such as vinyl, rubber or neoprene. Second squeegee blade 17 can be secured in any suitable known manner to or proximate the outer end 28b of extension member 26. For example, second squeegee blade 17 can have an enlarged transversely extending base portion 17a which is received within the interior of a transversely extending channel 28c of extension member/portion 28. Channel 28c can be sized and shaped so that second squeegee blade 17 may be frictionally engaged to the extension member 28 or may be engaged by abutting surfaces of channel member 28c and base portion 17a, to resist blade 17 from becoming dislodged from extension member/portion 28. Channel 28c and base portion 17a of blade 17 may be configured so that blade 17 can be removed for replacement without undue force having to be applied. For example, base portion 17 may be configured to be able to be transversely fed into channel 28c and the remainder of blade may extend through and extend outward from channel member 28c. Thus, second squeegee blade 17 can be held in position so that it does not move relative to extension member 28 when subject to normal use by a person utilizing second squeegee blade 17 for cleaning a surface area. Second squeegee blade 17 can also have an outer, pointed end 17b for engaging such a surface area. Similarly, apparatus 110 may be provided with a squeegee blade 117 which may be like blade 17.

In the embodiment of FIGS. 3A, 5A, 6, 7 and 9-15, another alternate apparatus 210 shown which is constructed in a manner similar to the embodiment of FIGS. 1 and 2. Handle 212 has an overall length L extending along a longitudinal direction on axis X and generally includes a first end 220 and a second end 222. According to one aspect, the length L of handle 212 may range from about 12 inches to about 30 inches, while in other aspects, the length of handle 212 may range from about 20 inches to about 28 inches, while in still other aspects the length of handle 212 may range from about 22 inches to about 26 inches.

Handle 212 may be formed from any suitable material or materials just like the materials of handle 12 described above. Handle 212 may be made of a plastic injection molded material and is formed via a plastic injection molding process. However, it should be understood that other types of materials and formation processes or manufacturing techniques are also contemplated for use in association with the present disclosure. Although depicted as generally cylindrical in cross-section, handle 212 may have any other geometric shape, such as polygonal (for e.g. triangular, rectangular or hexagonal) in cross section without deviating from the spirit and scope of the present disclosure. Handle 212 can also have a thickness or width to provide a grip for a user's hand just like handle 12 referenced above.

Figure 6:
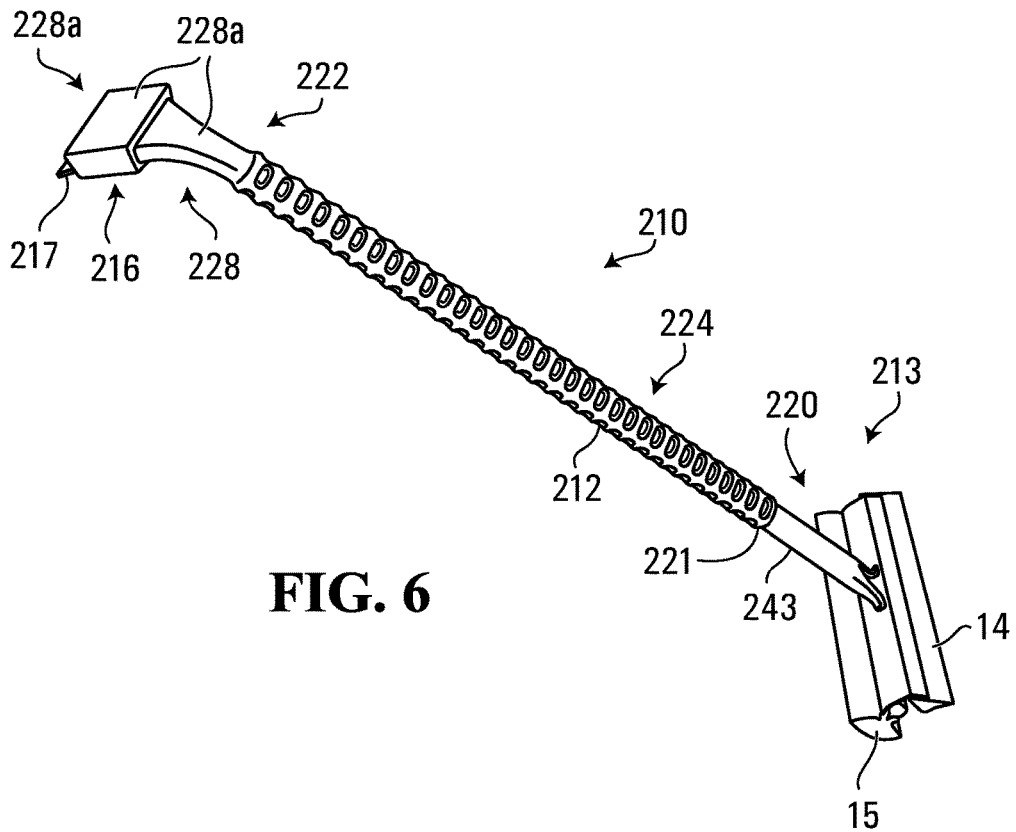
FIG. 6 is a perspective view of an alternate embodiment.
Figure 7:
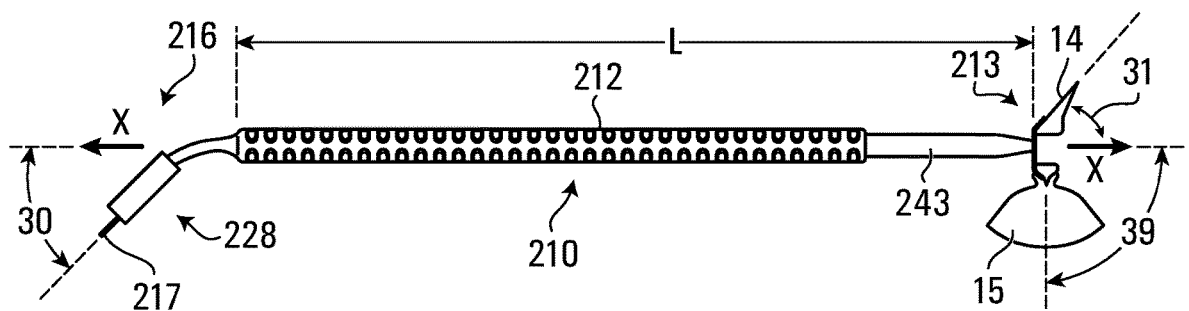
FIG. 7 is a side elevation view of the embodiment of FIG. 6.

Handle 212 can also include a plurality of recesses 224 (eg. FIGS. 6 and 7) that may provide for: a better gripping surface; a reduction in the amount of material required in forming handle 12 without significantly reducing its strength and integrity; and, a reduction in weight which can lead to a reduction in the overall weight and associated cost of material of squeegee apparatus 210. The plurality of recesses 224 may be formed in any desired geometric (or other) pattern. Thus, the plurality of recesses 224 can take the form of holes of a square, rectangle or other cross-sectional shape such as a circular or oval cross-sectional shape shown in FIGS. 6, 7 and 9-15. The plurality of recesses 224 may cover a portion (i.e. 50% or less) of the surface of handle 12 or they may cover a majority (i.e. greater than 50%), of the surface of handle 212.

Referring to FIG. 7, each end of the apparatus 210 is shown with first cleaning device 213 and second cleaning device 216 located on opposite ends of handle 212 to allow less obstruction from clothes and hands when using the scrub side of first cleaning device 213 (ie. sponge portion 15) side. This view also illustrates a 45-degree angle 30 to the longitudinal axis of the handle of the smaller end squeegee device to allow easier access to "difficult to reach" areas. First cleaning device 213 can be constructed like first cleaning device 213.

Referring to FIGS. 6 and 7 in particular, in order to couple handle 212 to the first cleaning device 213 (which may be constructed like first cleaning device 13), the first end 220 may comprise a first connector for cooperatively engaging with a second connector of first cleaning device 213.

Figure 3A:
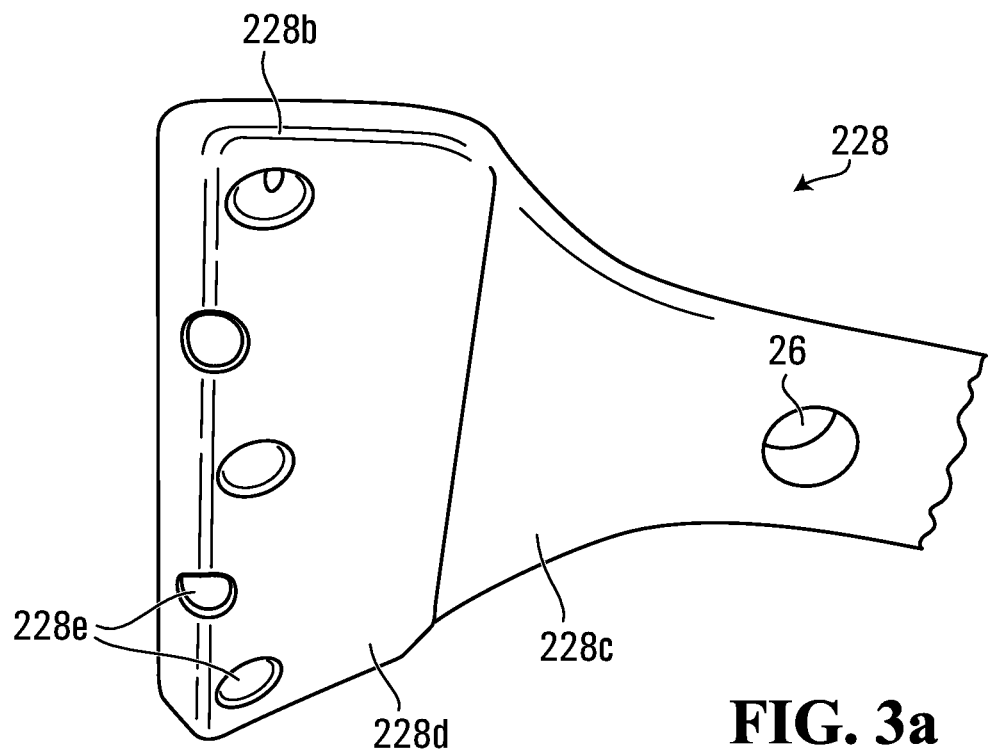
FIG. 3A is an enlarged perspective view of an end portion of the alternate embodiment of FIG. 3.

In the embodiment of FIGS. 3A, 5A, 6, 7 and 9-15, with particular reference to FIG. 3A, the second squeegee blade 217 (which may be like second squeegee blades 17 and 117) but in this embodiment may be secured to the outer end 228b of extension member 228 by a known type of over molding process. As shown in FIG. 3A, extension member 228 can include an attachment portion 228d which the second squeegee blade 217 can be molded on to. Bond enhancement surfaces 228e can be added to the attachment portion 228d in order to provide an increase in surface area that is available for bonding to the second squeegee blade 217 and also to lock the second squeegee blade 217 to the extension member 228. For example, such bond enhancement surfaces 228e may include one or more indentations, holes, channels or grooves machined or molded into the surface of extension member 228. As shown in FIG. 3A, holes and indentations are provided to not only increase the surface area that is available for bonding between second squeegee blade 217 and extension member 228, but also to provide an efficient way to lock the second squeegee blade 217 to the extension member 228. The holes and/or indentations are sufficiently large to allow during an over molding process for the molding material used in forming the second squeegee blade 217 to flow completely into the holes and/or indentations. While the holes and indentations shown in FIG. 3A are cylindrical in shape, a wide variety of other surface shapes are possible depending upon design requirements. For example, the holes and indentations may have square or rectangular cross-sections, triangular cross-sections or other polygonal cross-sectional shapes, as well as elliptical cross-sections and randomly shaped cross-sections. The cross-sectional shape and minimum size of the holes and indentations is limited by the ability of the molding material to fill the opening completely during the molding process as well as structural design considerations.

The molding material used in forming second squeegee blade 217 may be any thermoplastic elastomer compatible with the extension member 228. Examples of such molding materials can include, but are not limited to, acrylonitrile butadiene styrene ("ABS"), polycarbonate ("PC), ABS/PC, an aliphatic polyamide, polyoxymethylene, polymethyl methacrylate, polypropylene, polybutylene terephthalate, polyphenylsulfone, polyether ketone, polyetherimide, polytetrafluoroethylene and mixtures thereof.

Second squeegee blade 217 can be molded over extension member 228 using conventional high pressure molding procedures. Typical high pressure curing temperatures for the molding material can range from 170° C. to 225° C. Internal pressures within the mold are generally above 500 psi and below 2000 psi at the curing temperature.

Figure 5A:
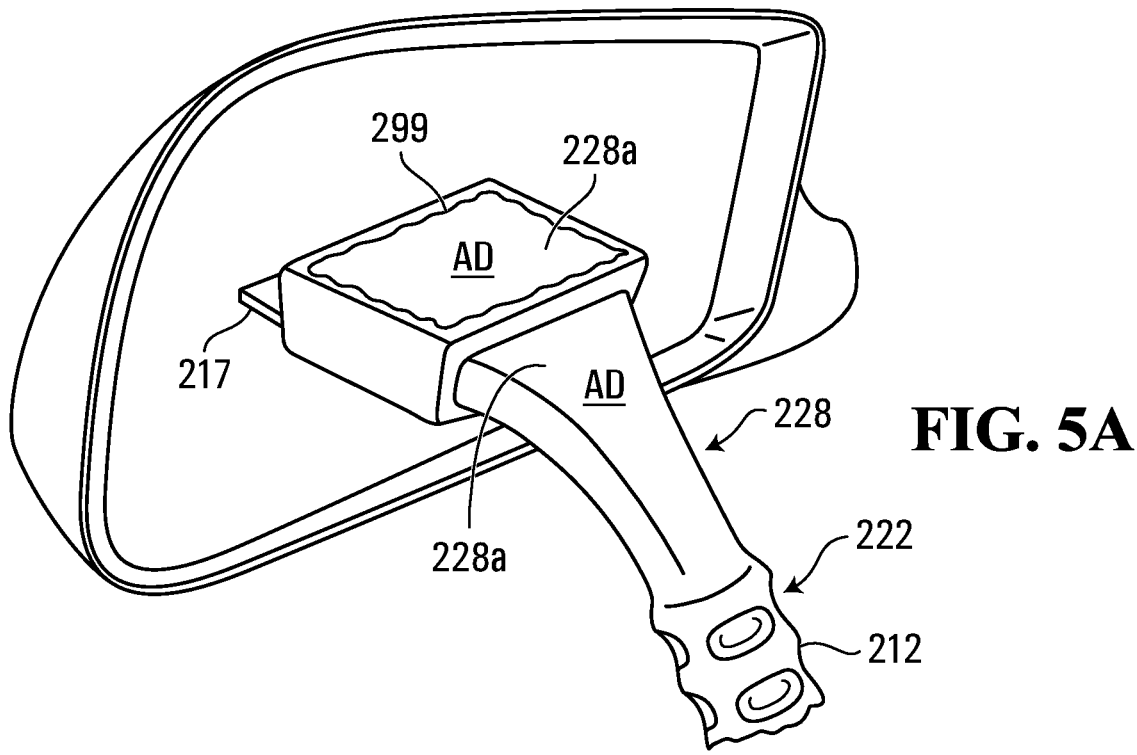
FIG. 5A is a perspective view of an end portion of the embodiment of FIG. 6 showing a small squeegee device in use on a side mirror of a vehicle

If desired, second squeegee blade 217 over molded onto extension member 228 may also include one or more polygonal flat faces 228a dimensioned to provide an enlarged surface area to enable viewing of advertising indicia as shown in FIG. 6. In this regard, referring to FIG. 5A, second end 222 of handle 212 may include an extension member or integrally formed portion 228 which can be angled with respect to longitudinal axis through handle 212. Extension member/portion 228 may have a smooth surface, as shown in FIG. 5A or it may also include a plurality of recesses (not shown). Extension member/portion 228 can include one or more polygonal flat faces 228a forming a display area upon which advertising indicia may be connected. The polygonal flat face 228a can be dimensioned to provide an enlarged surface area to enable viewing of an advertising indicia not only while squeegee apparatus 210 is being used, but also while it is stored in a bin of a motor vehicle washing service unit. The advertising indicia can be connected and secured to the polygonal flat face 228a in a variety of ways. For example, the advertising indicia may be a decal that can be adhesively secured to the polygonal flat face 228a, or the advertising indicia can be printed directly onto the polygonal flat face 228a. In some aspects, the polygonal flat face 228a can be dimensioned such that it extends radially outward from the periphery of extension member 228 as shown in FIG. 5A. In another aspect, the radial extent of the polygonal flat face 228a may be within the periphery of extension member 228.

As shown in FIGS. 2 and 7, after second squeegee blades 17/117/217 have been secured to or provided on respective extension members 28/128/228, an angle 30 is formed between the longitudinal axis X and second squeegee blade 28/128/228). In some aspects, angle 30 can be less than 90° and greater than 5°, while in another aspect angle 30 can be less than 60° and greater than 35° while in still other aspects angle 30 can be less than 50° and greater than 40°, or in still other aspects angle 30 can be about 45°. Additionally, the centerline of the sponges 15/215 on each embodiment, may be oriented at an angle 39 that may be about 90 degrees, or it may be at another angle of between 90 degrees and 45 degrees.

In addition, second squeegee blade 17/117/217 can be sized and dimensioned to fit and remove liquid from smaller hard smooth surfaces of a motor vehicle, such as a side mirror (FIGS. 5, 5A), a small window or a headlight or other exterior light of a motor vehicle. In one aspect, second squeegee blade may have a width within a range of about 2 inches to about 6 inches, or second squeegee blade may have a width within a range of 2.5 inches to about 3.5 inches, or in some aspects second squeegee blade may have a width of about 3 inches.

As described above, inward ends of the first cleaning device for each embodiment, can include a second connector 41 for cooperatively engaging with the first connector 21/121/221 of connecting end 20/120/220 of handle 12/112/212 as described above.

For each first cleaning device 12/113/213, formed like first cleaning device 12, head 44 can include a generally C-shaped body with a first channel 46 defined on one end thereof, and a second channel 48 defined on an opposite end thereof. Channels 46 and 48 can include terminal edges positioned in facing relation to one another defining an opening there between, and each extending longitudinally along the length of the C-shaped body. In addition, the width of the openings defined by the terminal edges are narrower than the width separating the interior walls of channels 46 and 48, respectively, thereby permitting secure engagement of elements within channels 46 and 48.

An elongated sponge 15 can be fitted and securely attached within channel 48 using any known means in the art. For instance, in one aspect, prior to insertion of sponge 15 into channel 48, sponge 15 may have a square, transverse cross-sectional shape, with a V-shaped channel being longitudinally formed through the top surface thereof. A sheet of net-like webbing 15b may then be wrapped around, and in some aspects entirely around, sponge 15, with opposing, terminal edges thereof meeting at the vertex of the V-shaped channel, and a predetermined width of webbing can be doubled over itself along its side edges. The webbing 15b may be made from woven or non-woven tough wear resistant flexible materials such as nylon, polypropylene, rayon, cotton, polyethylene or other similar materials. In some aspects, the webbing material can have a sufficient thickness so as to provide a plurality of scraping edges projecting outwardly from the sponging surface of the sponge 15 to assist in the scraping of coarse material from the surface.

Prior to inserting sponge 15/webbing 15b into channel 48, an elongated stiffener can be placed into the V-shaped channel of sponge 15, whereby the stiffener can clamp the edges of webbing between itself and the vertex of the V-shaped channel, allowing sponge 15 to collapse there around. The entire assembly of stiffener, webbing 15b and sponge 15 may then be compressed and inserted into channel 48. Once in channel 48, the portion of sponge 15 therein expands and bears against the walls of channel 48 thereby securely positioning the assembly within channel 48. If desired, to ensure that sponge 15 and webbing 15b do not slide outwardly from channel 48, a pair of end caps can be provided which can be securely attached, or integrally molded, to each of the ends of the stiffener. The caps may be positioned on the exterior of, and in partially covering relation to, the ends of channel 48, thereby providing not only a means for retaining sponge 15 and the webbing 15b within channel 48, but also for preventing dirt, ice and other foreign debris from infiltrating channel 48 and thereby prematurely degrading sponge 15 and the webbing 15b. Additionally, when head 44 is composed of metal, the caps can prevent it from contacting, and consequently scratching a surface, such as a window or windshield, during use.

Sponge 15 can be sized and dimensioned to clean a surface. In one aspect, sponge 15 may have a width within a range of about 6 inches to about 12 inches, or the sponge may have a width within a range of about 8 inches to about 10 inches, or the sponge may have a width of about 9 inches.

First squeegee blade 14 can include a profile that permits it to be securely, slidingly positioned within first channel 46. First squeegee blade 14 can be made of a resilient elastomeric material, such as vinyl, rubber or neoprene and can be secured in any suitable known manner within channel 46. For example, first squeegee blade 14 can have a base 14a which is received within the interior of channel 46. Channel 46 can be sized so that first squeegee blade 14 is frictionally engaged but can be removed for replacement without undue force. Thus, first squeegee blade 14 can be fixed in position so that it does not move relative to body 44. First squeegee blade 14 can also have an outer, pointed end 14b for engaging a surface to be wiped.

In addition, first squeegee blade 17 can be sized and dimensioned to remove liquids from larger surfaces, such as a window or windshield of a motor vehicle. In one aspect, first squeegee blade may have a width within a range of about 6 inches to about 12 inches, or first squeegee may have a width within a range of 8 inches to about 10 inches, or first squeegee may have a width of about 9 inches.

In one aspect, each of first squeegee blade 14, sponge 15, webbing 15b, and head 44 (including channels 46 and 48) are of essentially identical lengths. Therefore, each of the cleaning elements accurately corresponds and fits within channels 46 and 48, and will not freely slide within the spaces defined therein.

As shown in FIGS. 2 and 7, after first squeegee blade 14 has been attached to head 44, an angle 31 is formed between the longitudinal axis X and first squeegee blade 14. In some aspects, angle 31 can be less than 90° and greater than 5°, while in another aspect angle 31 can be less than 60° and greater than 35° while in still other aspects angle 31 can be less than 50° and greater than 40°, or in still other aspects angle 31 can be about 45°.

As shown in FIGS. 2 and 7, in one aspect, first squeegee blade 14 and second squeegee blade 17/117/217 are positioned in opposite directions. For example, when first squeegee blade 14 is positioned vertically upward, second squeegee blade 17/117/217 is positioned vertically downward from the longitudinal axis of handles 12/112/212, or vice versa. Applicant has surprisingly found when first squeegee blade 14 and second squeegee blade 17/117/217 are oriented in such manner, a user may be able to use the sponge 15 portion of first cleaning device 13/113/213 to clean a surface without obstructions. Additionally, a user may be able use the first squeegee blade 14 to remove liquid from a surface without second squeegee blade 17/117/217 contacting the user's clothing or skin.

In another aspect, there is provided a kit including: (i) a handle comprising a first end and a second end, the second end having a first cleaning device comprising a first squeegee blade secured thereon; and (ii) a second cleaning device comprising a sponge and second squeegee blade. The first end of the handle may further include a first connector for cooperatively engaging with a second connector of first cleaning device. The first connector can be an externally threaded extension shaped to engage with an internally threaded bore of second connector. In addition, the kit may further include a net-like webbing wrapped around (or in some instances entirely around) the sponge. In other aspects, the second end of the handle may include one or more polygonal flat faces that form a display area upon which advertising indicia may be connected.

Figure 8:
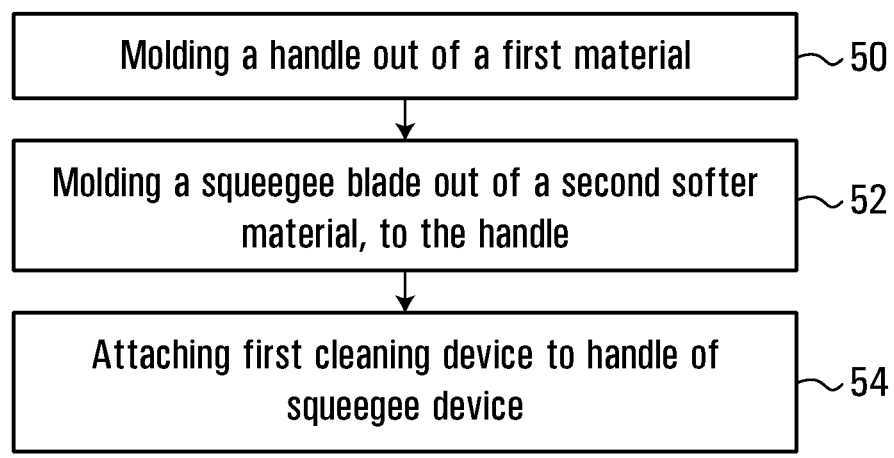
FIG. 8 depicts a method for manufacturing an embodiment.
Figure 9:
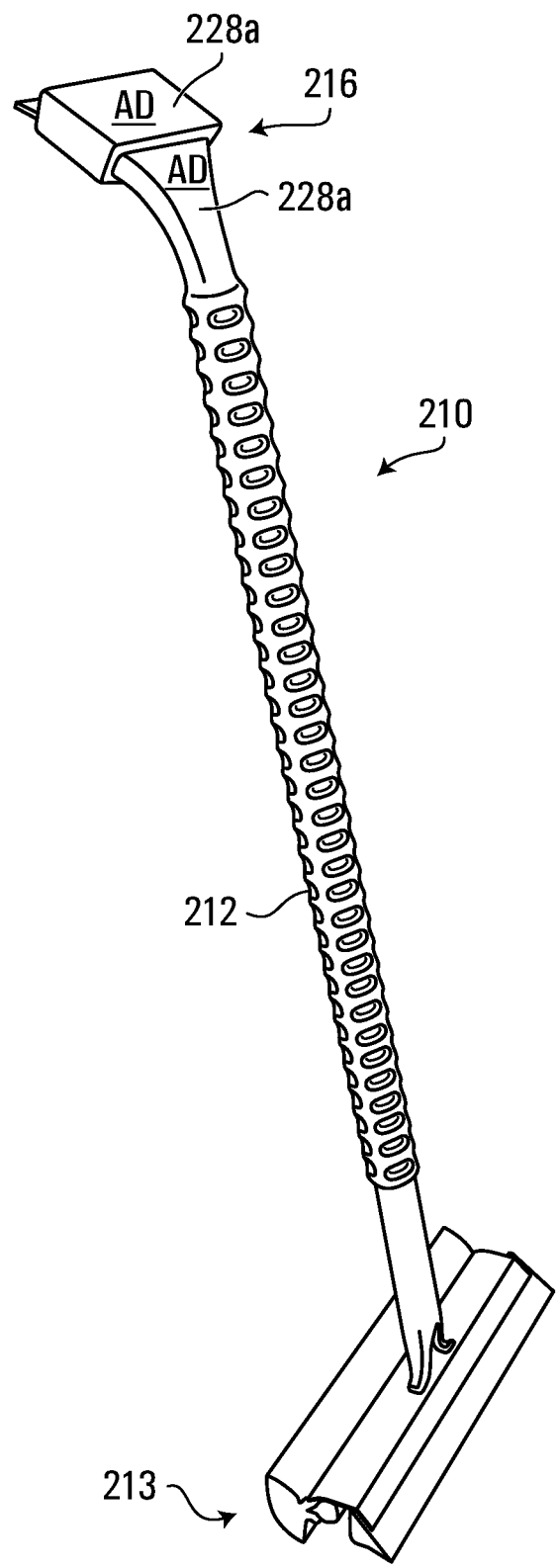
FIG. 9 is a top perspective view of the embodiment of FIG. 6.
Figure 10:
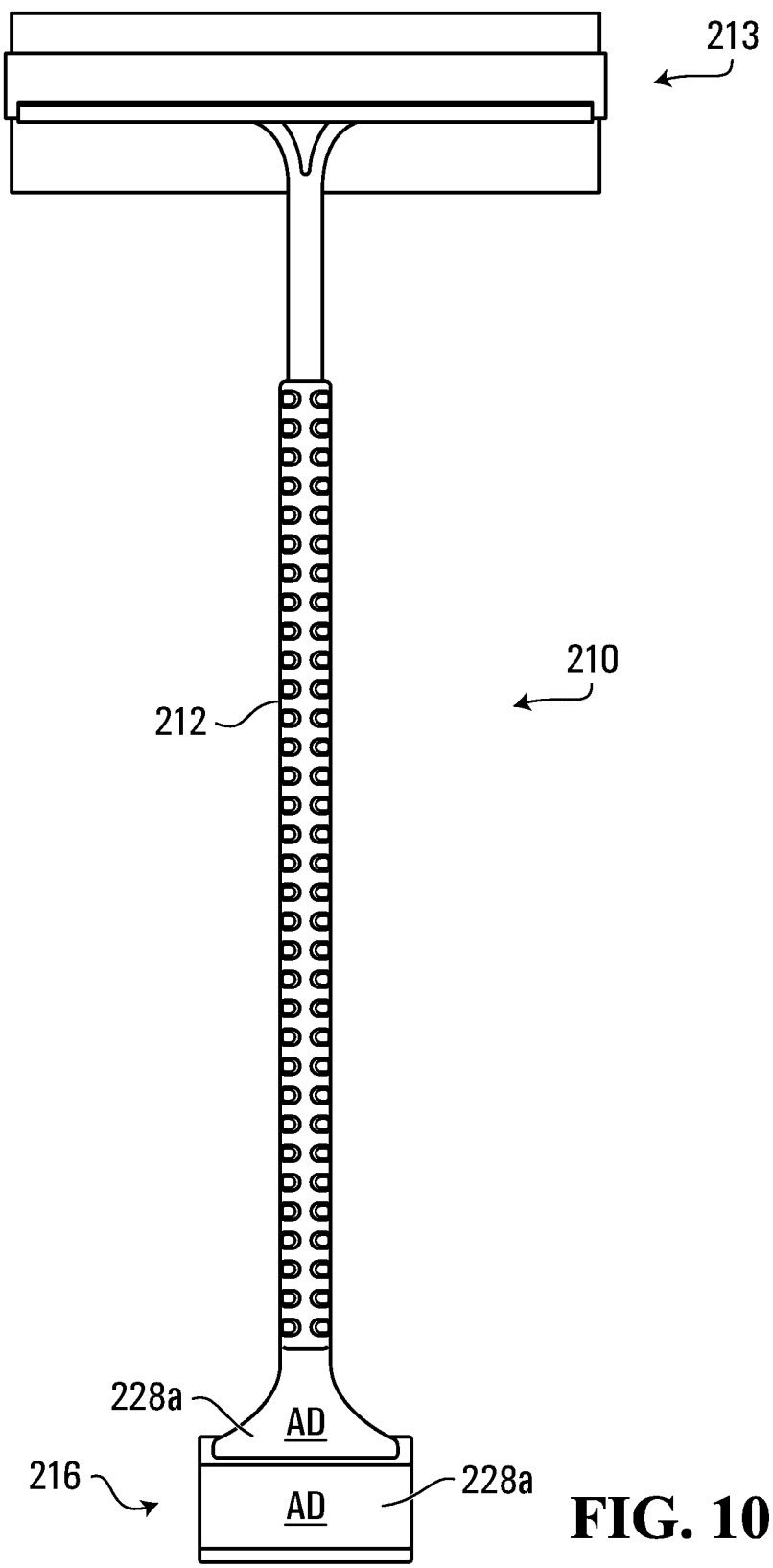
FIG. 10 is top plan view of the embodiment of FIG. 6.
Figure 11:
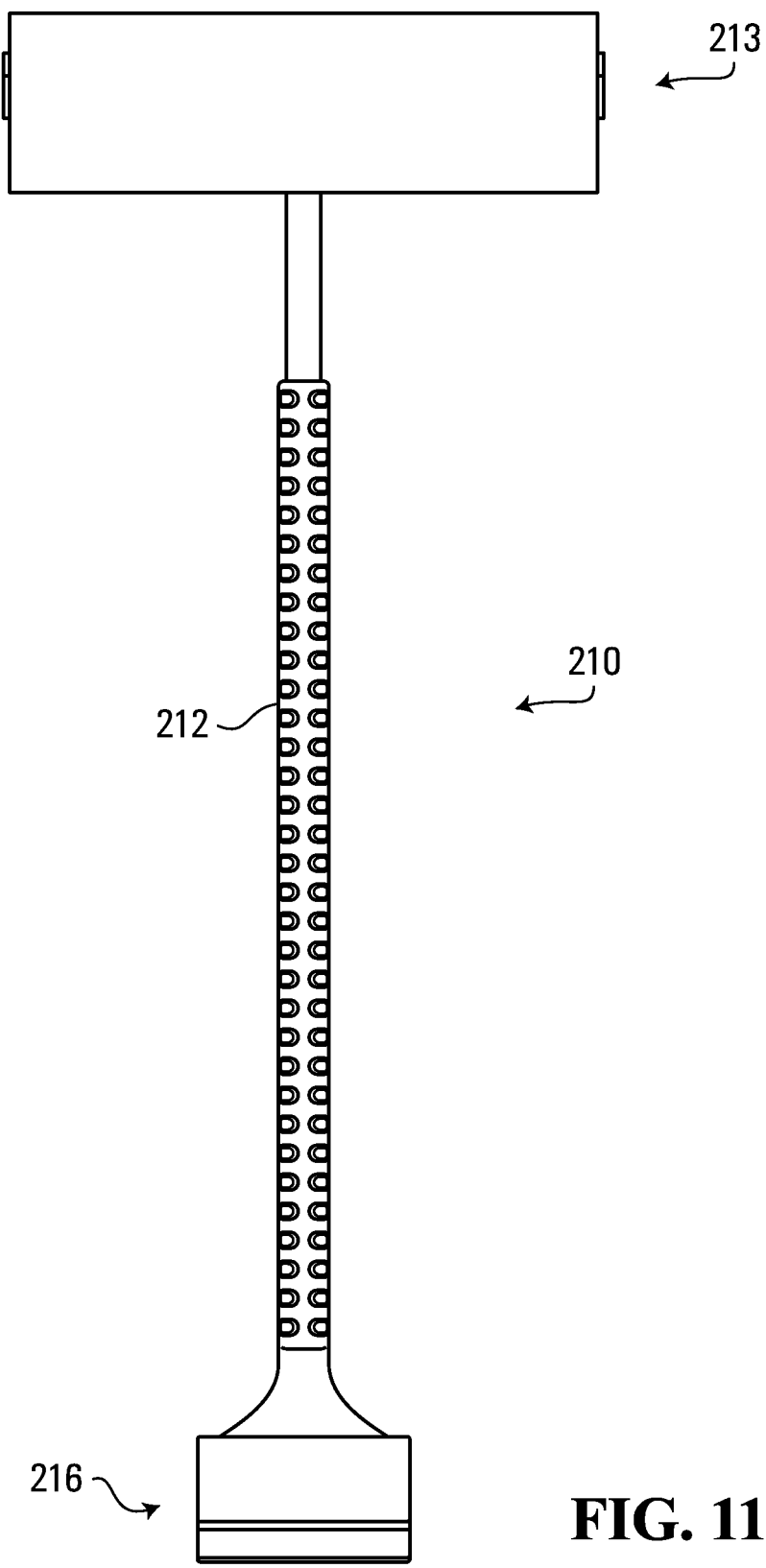
FIG. 11 is bottom plan view of the embodiment of FIG. 6.
Figure 12:
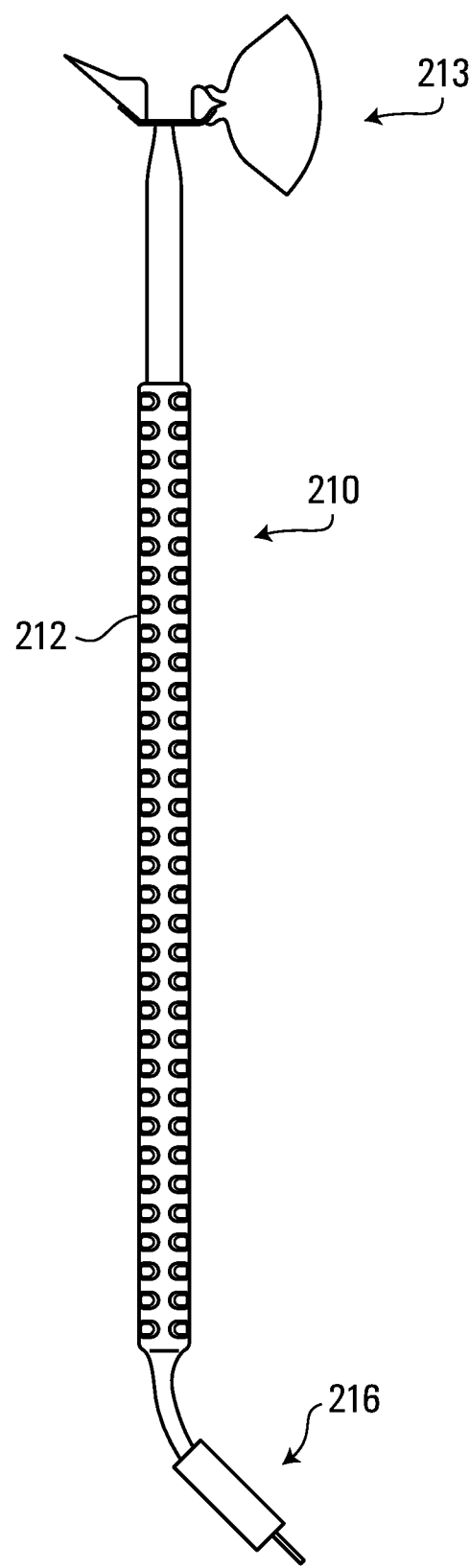
FIG. 12 is right side elevation view of the embodiment of FIG. 6.
Figure 13:
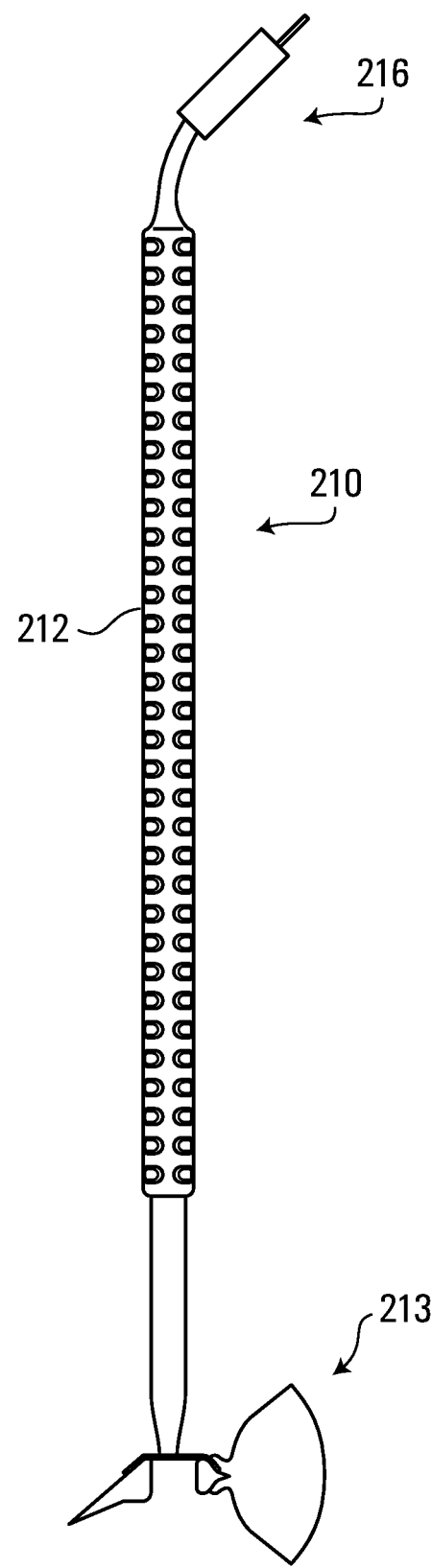
FIG. 13 is a left side elevation view of the embodiment of FIG. 6.
Figure 14:
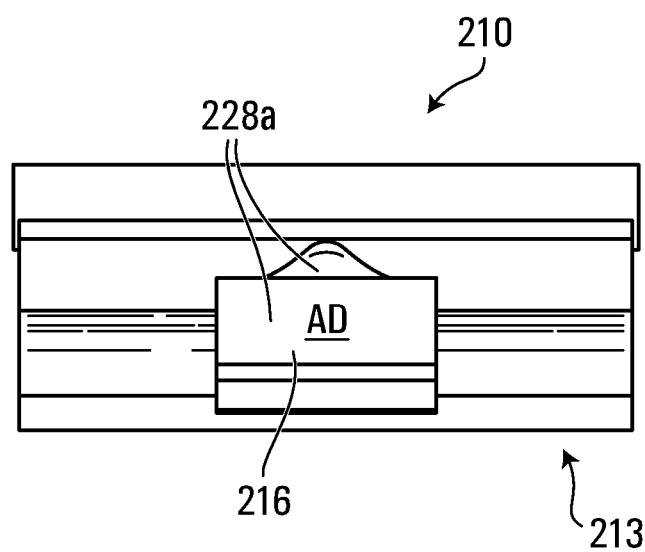
FIG. 14 is a front elevation view of the embodiment of FIG. 6.
Figure 15:
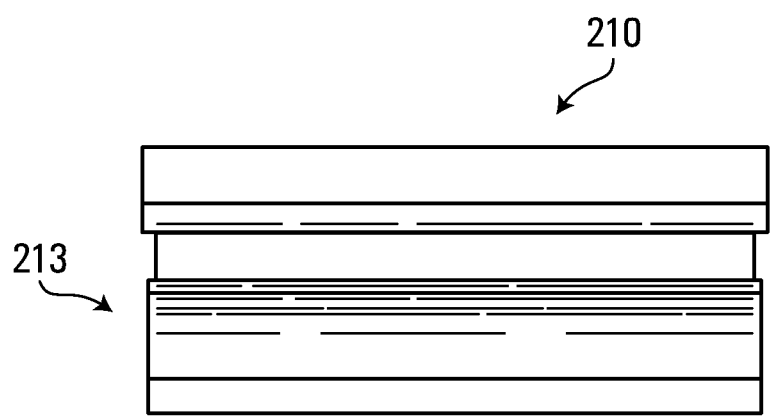
FIG. 15 is a rear elevation view of the embodiment of FIG. 6.

FIG. 8 depicts another aspect of a method for manufacturing the squeegee device described above that is adapted to clean and remove liquid from surfaces. In step 50, a handle may be molded out of a first material. The first material may comprise plastic, especially rigid plastic, or other materials known in the art. Subsequently, in step 52, a squeegee blade may be molded out of a second material having a softer hardness than the first material, to a first end of the handle. The second material may comprise any thermoplastic elastomer that is compatible with rigid plastic. Examples of such molding materials can include, but are not limited to, acrylonitrile butadiene styrene ("ABS"), polycarbonate ("PC"), ABS/PC, an aliphatic polyamide, polyoxymethylene, polymethyl methacrylate, polypropylene, polybutylene terephthalate, polyphenylsulfone, polyether ketone, polyetherimide, polytetrafluoroethylene and mixtures thereof. In step 54, a first cleaning device may be secured to a second end of the handle opposite the first end. The first cleaning device may comprise a sponge optionally having a net-like webbing wrapped around it and a squeegee blade. The first cleaning device may be secured to the handle in such a way that when the squeegee blade of the first cleaning device is positioned vertically upwards, the squeegee blade molded to the first end of the handle is positioned vertically downward or vice versa.

In still yet another aspect, there is provided a method for cleaning a hard surface of a motor vehicle with the squeegee device of the present disclosure including applying liquid surface cleaner stored in the sponge of the first cleaning device to the surface; squeegeeing the liquid off the surface using the first squeegee blade and/or the second squeegee blade. The hard surface may include a window, windshield, side mirror, headlight or tail light.

Also provided is a method for cleaning a first hard surface of a motor vehicle and a second hard surface of a motor vehicle with any of the apparatuses described herein. of any one of claims. The method comprises: (i) squeegeeing the liquid off the first hard surface using the first squeegee blade; and (ii) and squeegeeing the liquid off the second hard surface using the second squeegee blade. The first hard surface may comprise a window or windshield and the second hard surface may comprises a side mirror, headlight or tail light.

Although the present invention has been illustrated and described here in regarding preferred embodiments and specific drawings thereof, it will be clear that all such equivalent embodiments and examples are within the scope of the present invention, are contemplated thereby, and are intended to be covered by the following claims.

A need in the market has been identified that has not been previously addressed.

Disclosed is an apparatus that may be a combined plastic and stainless-steel dual ended squeegee that may be suitable for fuel station chains to purchase but will also be available for public consumption as well. These dual squeegees may easily replace the current squeegees. It is specifically designed to add the additional ability to reach areas that current models on the market have not been able to.

The invention claimed is:

1. A vehicle cleaning apparatus comprising an elongated handle consisting of a first end and a second end, a first cleaning device positioned proximate the first end of the handle and a second cleaning device positioned proximate the second end of the handle, the second end oppositely disposed from the first end of the handle, wherein the first cleaning device comprises a first squeegee and a sponge and the second cleaning device comprises a second squeegee blade and wherein the first squeegee blade of the first cleaning device is positioned vertically upward from a longitudinal axis of the handle and the second squeegee blade of the second cleaning device is positioned vertically downward from the longitudinal axis of the handle such that they are generally orientated in an opposite direction from one another and at angle of less than 50° and greater than 40° from the longitudinal axis of the handle.

2. An apparatus as claimed in claim 1 wherein the second squeegee blade has a transverse width that is substantially less than a transverse width of the first squeegee blade.

3. An apparatus as claimed in claim 2 wherein the transverse width of the second squeegee blade is in the range of about 2 inches to about 6 inches.

4. An apparatus as claimed in claim 2 wherein the transverse width of the second squeegee blade is about 3 inches.

5. An apparatus as claimed in claim 1 wherein the transverse width of the first squeegee blade is in the range of about 6 inches to about 12 inches.

6. An apparatus as claimed in claim 1 wherein the transverse width of the first squeegee blade is in the range of about 8 inches to about 10 inches.

7. An apparatus as claimed in claim 1 wherein the transverse width of the first squeegee blade is about 9 inches.

8. An apparatus as claimed in claim 1 wherein the second cleaning device has a transverse width that is substantially less than a transverse width of the first cleaning device.

9. An apparatus as claimed in claim 1 wherein the second squeegee blade has a transverse width that is suitable for cleaning at least one of a mirror or light of a vehicle and the first squeegee blade has a transverse width that is unsuitable for cleaning at least one of a side mirror or light of a vehicle.

10. An apparatus as claimed in claim 1 further comprising a flat surface proximate the second end of the handle, said flat surface comprising advertising indicia.

11. An apparatus as claimed in claim 10 wherein said flat surface comprises part of said second cleaning device.

12. An apparatus as claimed in claim 10 wherein said flat surface is oriented at an angle to the longitudinal axis of said handle.

13. An apparatus as claimed in claim 1 wherein said second cleaning device is formed by an over-molding process wherein said second squeegee blade is secured to said handle as an over-molded part which is over-molded on an end portion of said handle.

14. An apparatus as claimed in claim 1 wherein said handle is comprised of a plurality of apertures along a length.

15. An apparatus as claimed in claim 14 wherein said handle with said plurality of apertures is formed by an injection molding process.

16. A vehicle cleaning apparatus comprising an elongated handle consisting of a first end and a second end, a first cleaning device positioned proximate the first end of the handle and a second cleaning device positioned proximate the second end of the handle, the second end oppositely disposed from the first end of the handle, wherein the first cleaning device comprises a first flexible blade operable for removing liquid from a smooth surface, said first flexible blade having a width, the second cleaning device comprising a second flexible blade operable for removing liquid from a smooth surface, said second flexible blade having a width that is greater than the width of the first flexible blade and wherein the first flexible blade of the first cleaning device is positioned vertically downward from a longitudinal axis of the handle and the second flexible blade of the second cleaning device is positioned vertically upward from a longitudinal axis of the handle such that they are generally orientated in an opposite direction from one another and at angle of less than 50° and greater than 40° from the longitudinal axis of the handle.

17. A kit comprising: (i) a first part comprising a handle consisting of a first end and a second end, the second end having a first cleaning device comprising a first squeegee blade secured thereon; and (ii) a second part comprising a second cleaning device, the second cleaning device comprising a sponge and a second squeegee blade, wherein the first end of the first part comprises a first connector for cooperatively engaging with a second connector of the second part and wherein when the first part and second part are engaged the first squeegee blade of the first cleaning device is positioned vertically downward from a longitudinal axis of the handle and the second squeegee blade of the second cleaning device is positioned vertically upward from a longitudinal axis of the handle such that they are generally orientated in an opposite direction from one another and at angle of less than 50° and greater than 40° from the longitudinal axis of said handle.

18. A vehicle cleaning apparatus comprising (i) an elongated handle consisting of a first end and a second end, (ii) a first cleaning device positioned proximate the first end of the handle wherein the first cleaning device comprises a first squeegee blade, and further comprising a flat surface proximate the first end of the handle, said flat surface comprising advertising indicia and (iii) a second cleaning device positioned proximate the second end of the handle, the second end oppositely disposed from the first end of the handle, wherein the second cleaning device comprises a second squeegee blade and a sponge and wherein the first squeegee blade is positioned vertically downward from a longitudinal axis of the handle and the second squeegee blade is positioned vertically upward from a longitudinal axis of the handle such that they are generally orientated in an opposite direction from one another and at angle of less than 50° and greater than 40° from the longitudinal axis of said handle.

19. An apparatus as claimed in claim 18 wherein said flat surface comprises part of said first cleaning device.

20. An apparatus as claimed in claim 18 wherein said flat surface is oriented at an angle to the longitudinal axis of said handle.

21. An apparatus as claimed in claim 18 wherein said advertising indicia are located on a decal attached to said flat surface.

22. An apparatus as claimed in claim 18 further comprising a transparent label pouch adhesively attached to said flat surface and wherein said advertising indicia are located on a rigid material received within attached label pouch, such that said advertising indicia may be viewed as said rigid material is held in said label pouch.

* * * * *